US010998783B2

(12) United States Patent
Mukai (10) Patent No.: US 10,998,783 B2
(45) Date of Patent: May 4, 2021

(54) MAGNET-EMBEDDED MOTOR WITH A SHEW ANGLE FORWARD THEREIN AND COMPRESSOR USING SAME

(71) Applicant: Samsung Electronics Co., Ltd, Suwon-si (KR)

(72) Inventor: Katsuhisa Mukai, Kanagawa (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 206 days.

(21) Appl. No.: 16/303,132

(22) PCT Filed: May 18, 2017

(86) PCT No.: PCT/KR2017/005157
§ 371 (c)(1),
(2) Date: Nov. 19, 2018

(87) PCT Pub. No.: WO2017/200312
PCT Pub. Date: Nov. 23, 2017

(65) Prior Publication Data
US 2020/0313478 A1    Oct. 1, 2020

(30) Foreign Application Priority Data

May 19, 2016   (JP) .............................. JP2016-100756
Jan. 27, 2017   (JP) ................................ 2017-012626

(51) Int. Cl.
*H02K 1/27*    (2006.01)
*H02K 29/03*   (2006.01)
(Continued)

(52) U.S. Cl.
CPC ............. *H02K 1/276* (2013.01); *H02K 29/03* (2013.01); *H02K 1/28* (2013.01); *H02K 21/14* (2013.01);
(Continued)

(58) Field of Classification Search
CPC .......... H02K 1/276; H02K 1/28; H02K 29/03; H02K 21/14; H02K 2201/06; H02K 2213/03
(Continued)

(56) References Cited

U.S. PATENT DOCUMENTS 8,161,625 B2    4/2012  Akita
2007/0284961 A1*   12/2007  Takahashi .............. H02K 1/276
310/156.78

(Continued)

FOREIGN PATENT DOCUMENTS

EP          2234250 A1    9/2010
JP       2004-274826 A    9/2004
(Continued)

OTHER PUBLICATIONS

Machine translation of JP-2013132138-A. (Year: 2013).*
(Continued)

*Primary Examiner* — Michael Andrews (57) ABSTRACT

The present disclosure may reduce cogging torque by stacking steel plates which can form a stage skew by stacking the steel plates without reversing the front and back sides or by forming the stage skew by stacking the steel plates capable of easily distinguishing the front and back sides, and reduce both the sixth-order and twelfth-order dq coordinates of harmonic components, thereby achieving low toque ripple, high efficiency, and improved controllability. To this end, the present disclosure is an internal permanent magnet motor having a rotor in which a predetermined skew angle θs is formed between adjacent stages along the axial direction, wherein the rotor is formed by stacking a plurality of the steel plates having the same shape, each of the steel plates has a group of fastening holes made of the same number of the fastening holes as the number of the stages, and each of the fastening holes constituting the fastening group is
(Continued)

formed at a position where the skew angle θs changes along a circumferential direction one by one.

12 Claims, 11 Drawing Sheets

(51) Int. Cl.
*H02K 1/28* (2006.01)
*H02K 21/14* (2006.01)

(52) U.S. Cl.
CPC ..... *H02K 2201/06* (2013.01); *H02K 2213/03* (2013.01)

(58) Field of Classification Search
USPC .................................................. 310/156.53
See application file for complete search history.

(56) References Cited

U.S. PATENT DOCUMENTS

| | | | | |
|---|---|---|---|---|
| 2010/0277026 | A1* | 11/2010 | Yamaguchi | H02K 21/16 310/156.25 |
| 2012/0049686 | A1 | 3/2012 | Mizuike | |

FOREIGN PATENT DOCUMENTS

| | | | | |
|---|---|---|---|---|
| JP | 2004248442 | A | | 9/2004 |
| JP | 2009-131051 | A | | 6/2009 |
| JP | 2012-050253 | A | | 3/2012 |
| JP | 2013-132138 | A | | 7/2013 |
| JP | 2013132138 | A | * | 7/2013 |
| KR | 10-2010-0057935 | A | | 6/2010 |
| KR | 10-2013-0017176 | A | | 2/2013 |

OTHER PUBLICATIONS

International Search Report dated Aug. 18, 2017 in connection with International Patent Application No. PCT/KR2017/005157, 2 pages.
Written Opinion of the International Searching Authority dated Aug. 18, 2017 in connection with International Patent Application No. PCT/KR2017/005157, 2 pages.
European Patent Office, "Supplementary European Search Report," Application No. EP17799669.1, dated Mar. 8, 2019, 11 pages.

* cited by examiner

MAGNET-EMBEDDED MOTOR WITH A SHEW ANGLE FORWARD THEREIN AND COMPRESSOR USING SAME

CROSS-REFERENCE TO RELATED APPLICATIONS

This application is a 371 of International Application No. PCT/KR2017/005157 filed on May 18, 2017, which claims priority to Japanese Patent Application No. 2016-100756 filed on May 19, 2016 and Japanese Patent Application No. 2017-012626 filed on Jan. 27, 2017, the disclosures of which are herein incorporated by reference in their entirety.

BACKGROUND

1. Field

The present disclosure relates to an internal permanent magnet motor and a compressor using the same.

2. Description of Related Art

As a high-efficiency motor, an internal permanent magnet motor using reluctance torque in addition to magnet torque is used.

The internal permanent magnet motor may include a rotor having a skew formed therein.

The rotor has an upper stage element in which a steel plate is stacked and a lower stage element in which a steel plate is stacked as illustrated in Patent Document 1 (Japanese Patent Publication No. 2013-132138). For example, the rotor may be configured such that a predetermined stage skew angle θ is formed by rotating the lower stage element with respect to the upper stage element and fixing it with bolts or the like. More particularly, each of the steel plates constituting the upper stage element and the lower stage element has the same shape, and the steel plate constituting the upper stage element and the steel plate constituting the lower stage element may be stacked so that front and back sides are opposite to each other.

As described above, in order to form the predetermined stage skew angle θ, each steel plate has a plurality of bolt holes formed at regular intervals along a circumferential direction around the rotation axis of the rotor. Each bolt hole may be formed at a position which is changed by θ/2 in the same direction along a circumferential direction from a predetermined reference position.

However, in the structure as illustrated in Patent Document 1, since the bolt holes are formed at regular intervals along the circumferential direction, it is difficult to distinguish whether the steel plate is facing forward or backward. In this regard, for example, in order to manage a plurality of the steel plates by aligning them in the front and back sides, it takes time to discriminate the front and back sides. If the front and back sides are managed in an unaligned state, there may generate a problem that the front and back sides are stacked incorrectly when stacking the steel plates.

In order to solve the above-described problems, the present disclosure is to provide an internal permanent magnet motor capable of forming a stage skew by stacking the steel plates without reversing the front and back sides, or forming the stage skew by stacking the steel plates capable of easily distinguishing the front and back sides, and a compressor using the same.

SUMMARY

One aspect of the present disclosure provides an internal permanent magnet motor including: a rotor configured to be formed by stacking a plurality of steel plates having the same shape. The rotor may further include: an upper stage element stacked by aligning front and back sides of the plurality of steel plates; and a lower stage element formed by stacking the front and back sides of the plurality of steel plates opposite to the steel plates of the upper stage element. Each of the steel plates of the upper stage element and the lower stage element may form a plurality of fastening holes so that a predetermined skew angle θs is formed between adjacent stages along an axial direction.

The plurality of fastening holes may form at predetermined intervals along a circumferential direction around a rotation axis of the rotor and a dimension of one of the intervals of the adjacent fastening holes is different from a dimension of another one of the intervals.

The plurality of fastening holes may form at a position where the skew angle θs is changed one by one along the circumferential direction.

The plurality of fastening holes may be fastened by a fastening member. The fastening member may include bolts or rivets.

The steel plates may form 2n fastening holes. The n fastening holes formed continuously or the n fastening holes formed alternately may form at positions where the skew angle θs is changed in the same direction along the circumferential direction from a reference position, in the case where the 2n fastening holes are formed at regular intervals along the circumferential direction around the rotation axis of the rotor.

The steel plates may form n fastening holes. Two of the adjacent fastening holes may form so that the angle formed by a line connecting the center of each of the two fastening holes and the rotation axis of the rotor is (360/n)°−θs, and n−2 fastening holes excluding the two fastening holes are configured at regular intervals along the circumferential direction around the rotation axis of the rotor.

The steel plate may form one or a plurality of oil passage holes through which oil for a compressor is passed. The bolts or rivets may pass through the fastening holes so that the oil passage holes formed in the steel plates overlap each other.

The predetermined skew angle θs may be set based on a reduction rate with respect to an induced voltage when θ=0°.

The rotor may be formed with a two-stage skew, a three-stage skew or a four-stage skew.

The rotor may have a relation between number of poles p and number of slots s set to 1:3 or 1:6.

The skew angle θs may be determined by at least one of the following Equations 1 to 4.

$$\theta s = 120°/\text{LCM}(s \times p) \quad \text{[Equation 1]}$$

$$\theta s = 240°/\text{LCM}(s \times p) \quad \text{[Equation 2]}$$

$$\theta s = 90°/\text{LCM}(s \times p) \quad \text{[Equation 3]}$$

$$\theta s = 180°/\text{LCM}(s \times p) \quad \text{[Equation 4]}$$

wherein, the LCM(s×p) is a least common multiple of s and p.

Another aspect of the present disclosure provides an internal permanent magnet motor including: a rotor configured to be formed by stacking a plurality of steel plates having the same shape. The rotor may further include: an upper stage element stacked by aligning front and back sides of the plurality of steel plates; and a lower stage element stacked by aligning the front and back sides of the plurality of steel plates opposite to the steel plates of the upper stage element. Each steel plate of the upper stage element and the lower stage element may form a plurality of fastening holes so that a predetermined skew angle θs is formed between the upper stage element and the lower stage element.

It is possible to reduce the cogging torque by stacking the steel plates without reversing the front and back sides to form the stage skew, or by stacking the steel plates capable of easily distinguishing the front and back sides to form the stage skew. Both a sixth-order and twelfth-order of dq coordinates in the harmonic components are reduced, and low torque ripple and high efficiency can be achieved and controllability can be improved.

DETAILED DESCRIPTION

Reference will now be made in detail to the embodiments of the present disclosure, examples of which are illustrated in the accompanying drawings, wherein like reference numerals refer to like elements throughout.

The terms used in the present application are merely used to describe specific embodiments and are not intended to limit the present disclosure. A singular expression may include a plural expression unless otherwise stated in the context. In the present application, the terms "including" or "having" are used to indicate that features, numbers, steps, operations, components, parts or combinations thereof described in the present specification are present and presence or addition of one or more other features, numbers, steps, operations, components, parts or combinations is not excluded.

In description of the present disclosure, the terms "first" and "second" may be used to describe various components, but the components are not limited by the terms. The terms may be used to distinguish one component from another component. For example, a first component may be called a second component and a second component may be called a first component without departing from the scope of the present disclosure. The term "and/or" may include a combination of a plurality of items or any one of a plurality of items.

An internal permanent magnet motor and a compressor using the same according to embodiments of the present disclosure will hereinafter be described with reference to the attached drawings.

First, a first embodiment of the internal permanent magnet motor according to the present disclosure will be described.

Figure 1:
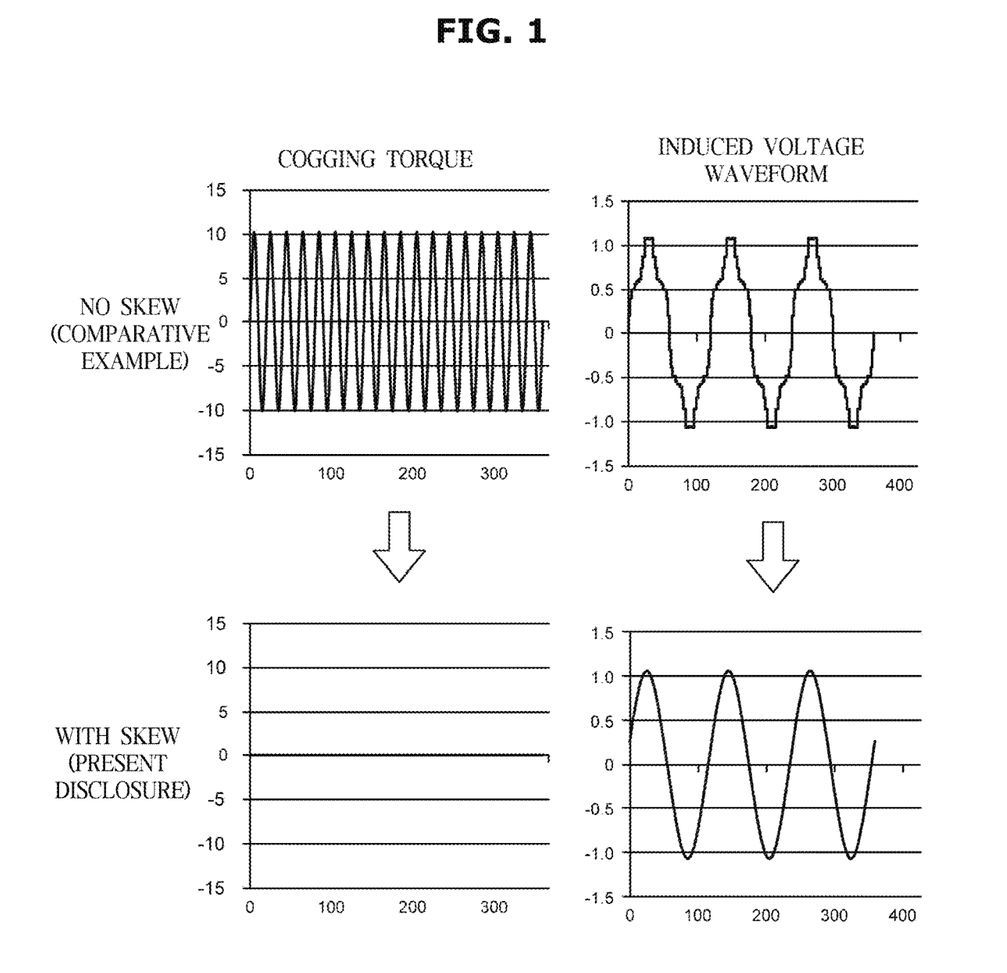
FIG. 1 is a view illustrating an experimental result of an internal permanent magnet motor according to a first embodiment of the present disclosure.

FIG. 1 is a view illustrating an experimental result of an internal permanent magnet motor according to a first embodiment of the present disclosure.

The internal permanent magnet motor according to the first embodiment of the present disclosure may be used, for example, in a compressor of a refrigeration cycle, wherein the relationship between a number of poles p and a number of slots s is 1:3, and it has a configuration of distributed winding.

The rotor constituting such internal permanent magnet motor may be formed in a multi-stage skew, and a predetermined skew angle θs may be formed between the adjacent stages along an axial direction.

Hereinafter, the rotor having a three-stage skew will be described.

Generally, in the internal permanent magnet motor having a configuration of the pole number p and the number of slots s, a number of cogging per rotation of the rotor may become the least common multiple of s and p (hereinafter referred to as 'LCM(s×p)').

Therefore, the periodic angle θc of cogging may be expressed by Equation 1.

$$\theta c = 360°/\text{LCM}(s \times p) \quad \text{[Equation 1]}$$

In the case of using the rotor in which the three-stage skew is formed, as in the first embodiment of the present disclosure, in order to cancel the cogging, the skew angle θs may be an angle expressed by Equation 2.

$$\theta s = \theta c/3 = 120°/\text{LCM}(s \times p) \quad \text{[Equation 2]}$$

Meanwhile, a harmonic component of an induced voltage of the internal permanent magnet motor is a periodic angle θv expressed by Equation 3.

$$\theta v = 360°/(p^* \times \text{order}) = 720°/(p \times \text{order}) \quad \text{[Equation 3]}$$

Here, p* is the maximum number, and p* is p/2.

In the case of using the rotor in which the three-stage skew is formed, as in the first embodiment of the present disclosure, in order to cancel the harmonic component, the skew angle θs may be expressed by Equation 4.

$$\theta s = 720°/(p \times \text{order} \times 3) \quad \text{[Equation 4]}$$

Here, the harmonic component causing a torque ripple is a sixth-order component and a twelfth-order component in a dq coordinate.

The sixth-order component in the dq coordinate may correspond to a fifth-order component and a seventh-order component in a xy coordinate and the twelfth-order component in the dq coordinate may correspond to an eleventh-order component and a thirteenth-order component in the xy coordinate.

From the above-described Equations 2 and 4, the skew angle θs1 for canceling the cogging, the skew angle θs2 for canceling the sixth-order harmonic component, and the skew angle θs3 for canceling the twelfth-order harmonic component may be obtained.

For example, when the number of poles is 4 and the number of slots is 12,

θs1=10° (corresponding to phase 120°),
θs2=10° (corresponding to phase 120°), and
θs3=5° (corresponding to phase 120°)

Therefore, when the skew angle θs is 10°, the cogging may be canceled and the sixth-order harmonic component may be canceled.

In addition, as for the twelfth-order harmonic components, skewing by 10° may correspond to changing the phase to 240°, which is the same as changing the phase by 120°. As a result, the twelfth-order harmonic component may be canceled by setting the skew angle θs at 10°.

Accordingly, in the internal permanent magnet motor with the three-stage skewed rotor, when the relationship between the number of poles p and the number of slots s is 1:3 and the skew angle θs is determined by the following Equation 5, the cogging torque and the sixth- and twelfth-orders of harmonic components may be canceled.

$$\theta s = 120°/\text{LCM}(p \times s) \qquad \text{[Equation 5]}$$

The internal permanent magnet motor according to the first embodiment of the present disclosure in which the skew angle θs is determined as described above may drastically reduce the cogging torque and the harmonic component of the induced voltage as illustrated in FIG. 1.

Next, a second embodiment of the internal permanent magnet motor according to the present disclosure will be described.

Figure 2A:
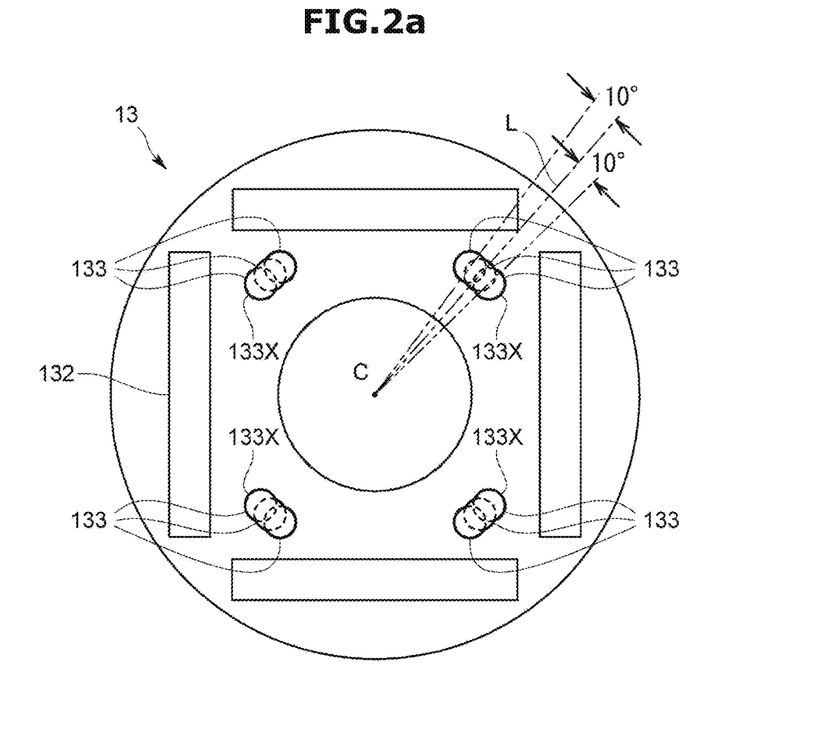
FIGS. 2A and 2B are schematic views illustrating a steel plate according to a modification of the first embodiment and a second embodiment of the present disclosure.
Figure 2B:
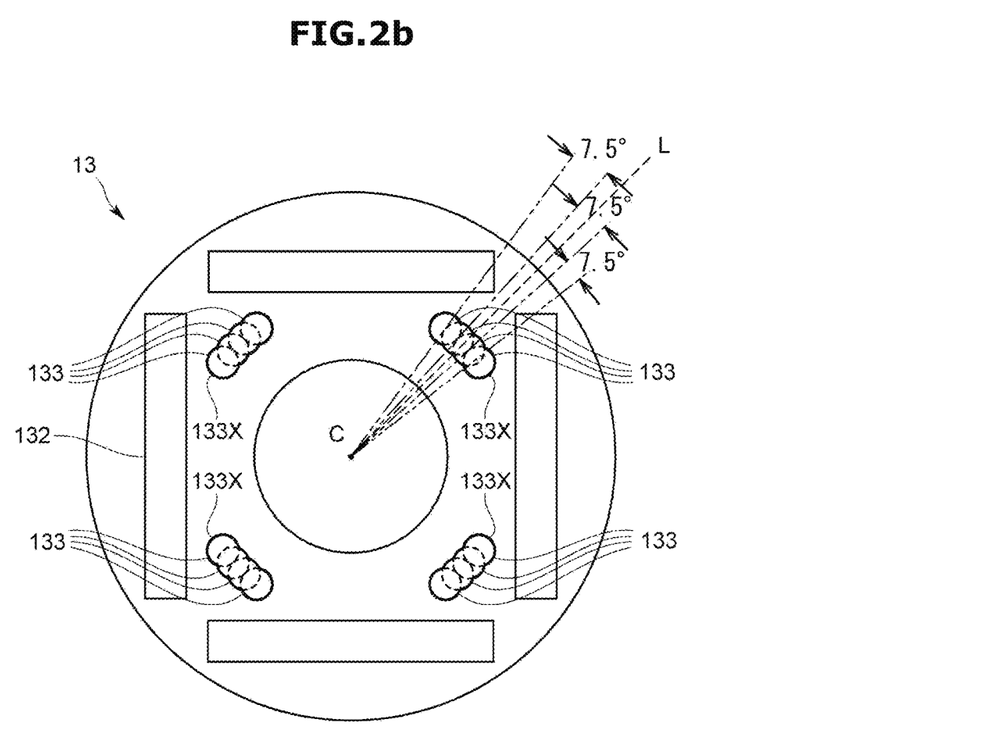

FIGS. 2A and 2B are schematic views illustrating a steel plate according to a modification of the first embodiment and a second embodiment of the present disclosure.

The internal permanent magnet motor according to the second embodiment of the present disclosure may have a configuration in which the relationship between a number of poles p and a number of slots s is 1:6.

Here, skew angles θs1, θs2, θs3 may be obtained from Equations 2 and 4 as in the first embodiment.

For example, when the number of poles is 4 and the number of slots is 24,

θs1=5° (corresponding to phase 120°),
θs2=10° (corresponding to phase 120°), and
θs3=5° (corresponding to phase 120°)

As a result, when the skew angle θs is set to 5°, the cogging torque and the twelfth-order harmonic component may be canceled, but the sixth-order harmonic component may not be canceled. This is because, for the sixth-order harmonic components, skewing by 5° may correspond to changing the phase by 60°, which is less than the phase of 120°.

Therefore, when the skew angle θs is set to 10° (i.e., twice the value obtained by Equation 2), the sixth-order harmonic component may be canceled. In the same manner as in the first embodiment, the cogging torque and the twelfth-order harmonic component may be canceled.

From the above, in the internal permanent magnet motor with the three-stage skewed rotor, when the relationship between the number of poles p and the number of slots s is 1:6 and the skew angle θs is determined by the following Equation 6, the cogging torque and the sixth- and twelfth-orders of harmonic components may be canceled.

$$\theta s = 240°/\text{LCM}(p \times s) \qquad \text{[Equation 6]}$$

The internal permanent magnet motor according to the present disclosure is not limited to the first and second embodiments.

In the first and second embodiments, the three-stage skew may be formed in the rotor, but a four-stage skew may be formed in the rotor.

Particularly, when the relationship between the number of poles p and the number of slots s is 1:3 and the skew angle θs is determined by the following Equation 7, the cogging torque and the sixth- and twelfth-orders of harmonic components may be canceled.

$$\theta s = 90°/\text{LCM}(p \times s) \qquad \text{[Equation 7]}$$

When the relationship between the number of poles p and the number of slots s is 1:6 and the skew angle θs is determined by the following Equation 8, the cogging torque and the sixth- and twelfth-orders of harmonic components may be canceled.

$$\theta s = 180°/\text{LCM}(p \times s) \qquad \text{[Equation 8]}$$

Also, in the internal permanent magnet motor with the two-stage skewed rotor, when the relationship between the number of poles p and the number of slots s are 1:3 or 1:6 and the skew angle θs is determined by the following Equation 9, the cogging torque and the sixth- and twelfth-orders of harmonic components may be canceled.

$$\theta s = 180°/\text{LCM}(p \times s) \qquad \text{[Equation 9]}$$

Thereby, the cogging torque and a first-order harmonic component may be canceled.

In addition, the rotor having the two-stage skew as described above may be configured to have the slot combination illustrated in the following Equation 10.

$$\text{Order} \times P^* = \text{LCM}(s \times p) \qquad \text{[Equation 10]}$$

In this way, especially the sixth-order or twelfth-order of harmonic components may be canceled.

The rotor according to the first and second embodiments of the present disclosure may be formed by stacking a plurality of steel plates having the same shape.

More particularly, each of steel plates 13 may have a group of fastening holes 133X made of the same number of fastening holes 133 as the number of single plates, as illustrated in FIG. 2A.

Each of the fastening holes 133 may be formed at a position where the skew angle θs is changed along the circumferential direction one by one and at a position symmetrical with respect to a reference line L passing through a center C of the steel plate 13.

Here, the steel plate 13 may have a plurality of the fastening hole groups 133X, and each of the fastening hole groups 133X may have three of the fastening holes 133 that are the same as the single plate.

Each of the fastening holes 133 may be formed so that an angle formed by neighboring line segments among the line segments connecting the center C of the steel plate 13 and the center of each of the fastening holes 133 is 10°.

As illustrated in FIG. 2B, in the rotor in which a four-stage skew is formed, each of the fastening hole groups 133X may be formed of four of the fastening holes 133, and each of the fastening holes 133 may be formed at a position changed by 7.5° along the circumferential direction one by one.

With this configuration, since each of the steel plates 13 has the same shape, for example, a cutting die, a metal mold, or the like for manufacturing the steel plate 13 may be made common, and the above-described skew angle θs may be formed on the rotor while reducing the cost and simplifying the manufacturing process.

Since the fastening holes 133 formed in the steel plates 13 are symmetrical with respect to the reference line L passing the center C of the steel plates 13, the shape of the steel plates 13 viewed from the plane may become the same on the front and the back surfaces, and the management of the steel plates 13 may be simplified.

Next, a third embodiment of the internal permanent magnet motor according to the present disclosure will be described.

The internal permanent magnet motor according to the third embodiment of the present disclosure may be used, for example, in a compressor of a refrigeration cycle, and may be provided with the rotor having the skew formed therein.

Hereinafter, the rotor, which is a characteristic part of the present disclosure according to the third embodiment, will be described with reference to FIGS. 3 to 5.

Figure 3:
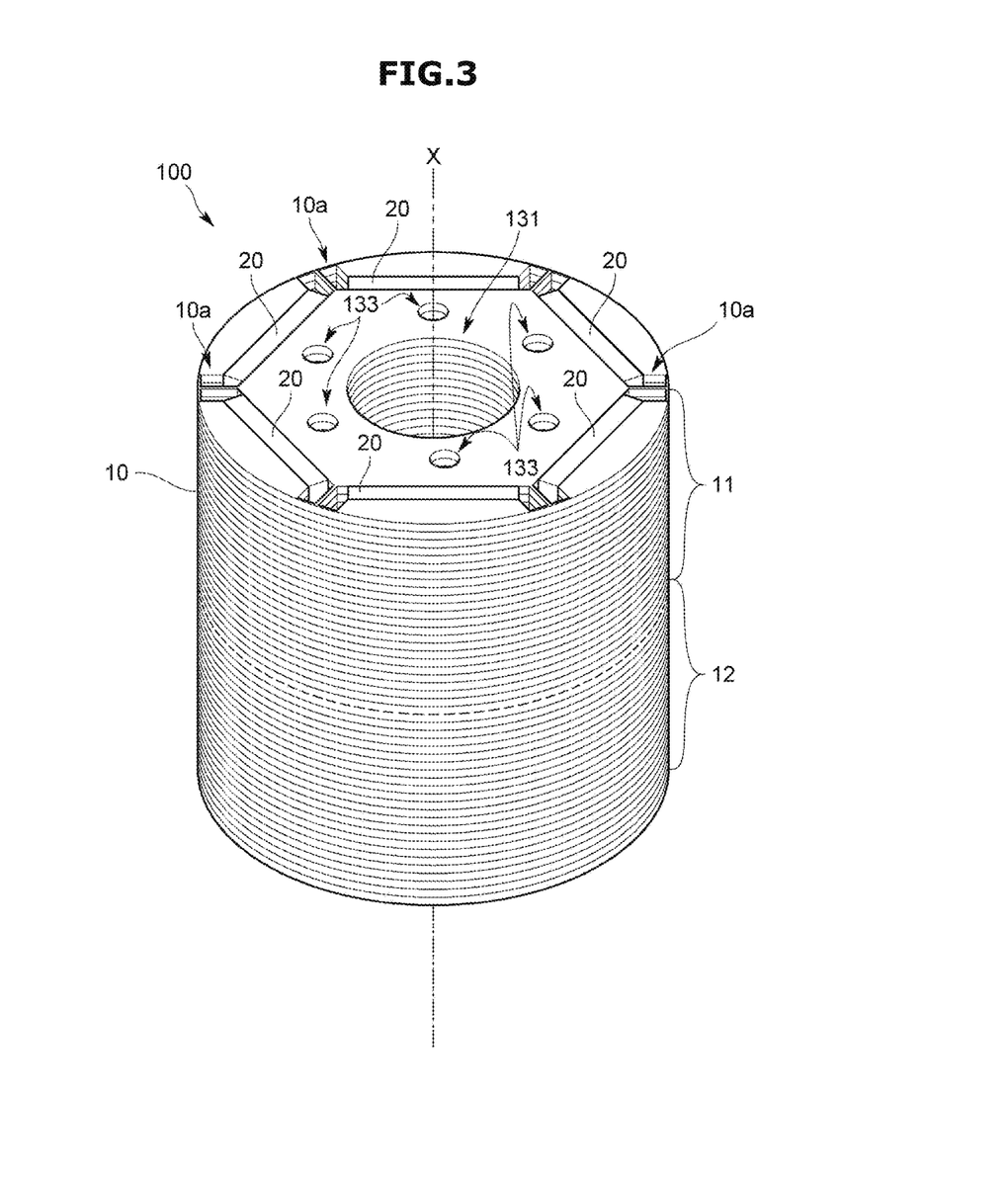
FIG. 3 is a schematic view illustrating a configuration of a rotor according to a third embodiment of the present disclosure.
Figure 4:
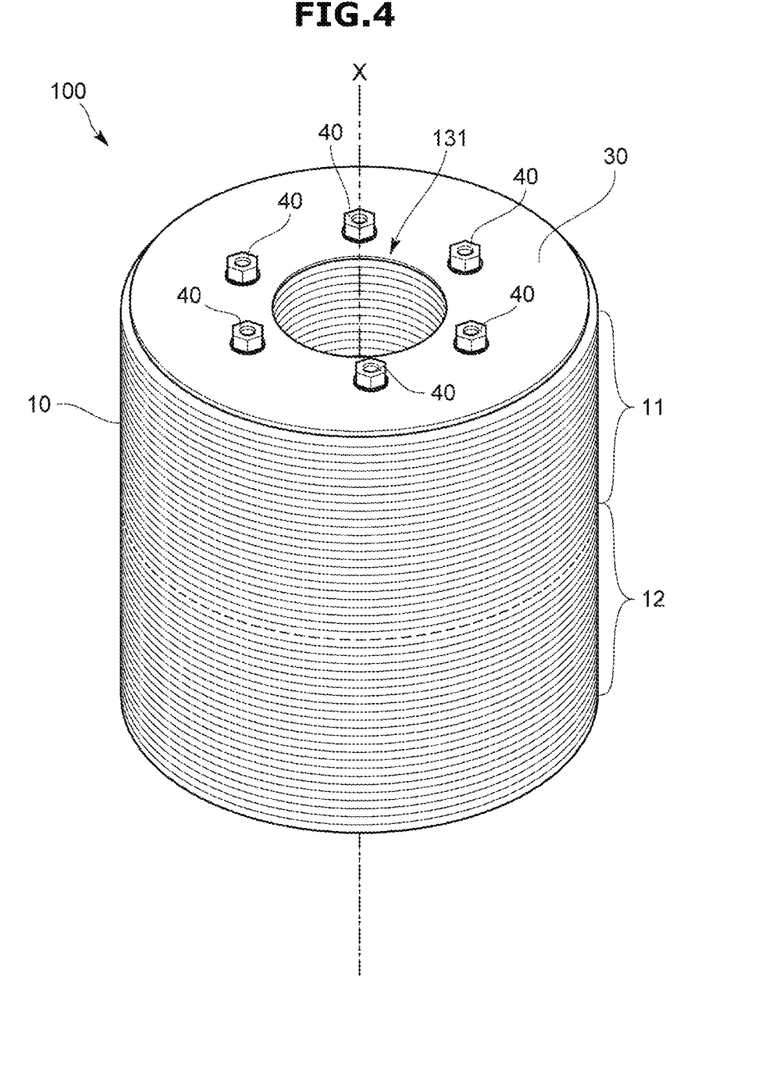
FIG. 4 is a schematic view illustrating a configuration of the rotor according to the third embodiment of the present disclosure.
Figure 5:
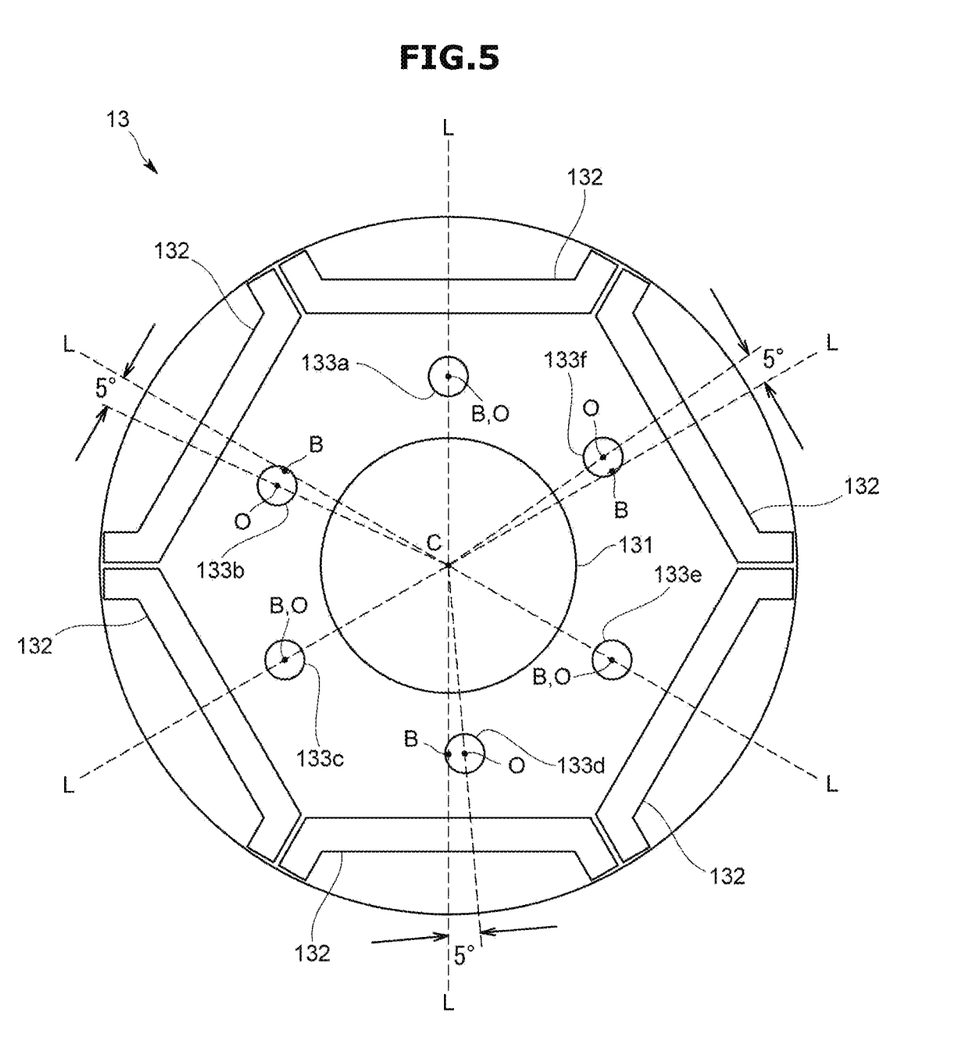
FIG. 5 is a schematic view illustrating a configuration of the steel plate according to the third embodiment of the present disclosure.

FIG. 3 is a schematic view illustrating a configuration of a rotor according to a third embodiment of the present disclosure, FIG. 4 is a schematic view illustrating a configuration of the rotor according to the third embodiment of the present disclosure, and FIG. 5 is a schematic view illustrating a configuration of the steel plate according to the third embodiment of the present disclosure.

As illustrated in FIGS. 3 and 4, a rotor 100 according to the third embodiment of the present disclosure may include a core 10, a permanent magnet 20, an end plate 30, and a fastening member 40.

Hereinafter, the rotor 100 having a predetermined stage skew angle θ of 5° will be described.

The permanent magnet 20 may be embedded in each of a plurality of magnetic embedding grooves 10a formed in the core 10 and equally spaced along the circumferential direction around a rotation axis X of the rotor 100. Particularly, it may be a sintered magnet such as a ferrite magnet or a rare earth magnet.

The end plate 30 may prevent the permanent magnets 20 embedded in the magnetic embedding grooves 10a from coming off and may be disposed opposite to the upper and lower ends of the core 10.

The fastening member 40 may fasten and fix the core 10 and the end plate 30, and here, for example, bolts and nuts made of SUS may be used. A rivet may also be used as the fastening member 40.

Hereinafter, the core 10 will be described in detail.

As illustrated in FIGS. 3 and 4, the core 10 according to the third embodiment of the present disclosure may include an upper stage element 11 in which the plurality of steel plates 13 are stacked and a lower stage element 12 in which the plurality of steel plates 13 are stacked. The upper stage element 11 and the lower stage element 12 may be fastened and fixed by the fastening member 40.

In the third embodiment of the present disclosure, the number of the steel plates 13 constituting the upper stage element 11 and the number of the steel plates 13 constituting the lower stage element 12 may be the same. Thereby, the primary component of the cogging torque may be sufficiently reduced. However, there may be some errors in the number of the steel plates 13 constituting the upper stage element 11 and in the number of the steel plates 13 constituting the lower stage element 12.

The plurality of steel plates 13 constituting the upper stage element 11 may all have the same shape and may be stacked by aligning the front and back sides.

The plurality of steel plates 13 constituting the lower stage element 12 may all have the same shape as that of the steel plates 13 of the upper stage element 11 and may be stacked in such a manner that the steel plates 13 of the upper stage element 11 are opposed to the front and back sides.

Each of the steel plates 13 may have a rough disc shape having a predetermined thickness dimension, and here, for example, a non-oriented electromagnetic steel plate is manufactured using a common cutting die or a common metal mold.

As illustrated in FIG. 5, each of the steel plates 13 may include a shaft hole 131 for inserting a shaft therethrough, a plurality of magnetic embedding holes 132 forming the magnetic embedding grooves 10a described above, and the plurality of fastening holes 133 through which the fastening member 40 is inserted. The holes 131, 132, and 133 may be formed so as to pass through the steel plate 13 in the thickness direction.

The shaft hole 131 may be formed at the center of the steel plate 13 and have a substantially circular shape with a predetermined diameter dimension. More particularly, the center of the shaft hole 131 may coincide with the center C of the steel plate 13, and the rotation axis X of the rotor 100 may pass through the centers of these.

The magnetic embedding holes 132 may be usually formed at regular intervals along the circumferential direction around the rotation axis X of the rotor 100 with a flux barrier. In the third embodiment of the present disclosure, an even number of the magnetic embedding holes 132 may be arranged at regular intervals along the circumferential direction around the center C of the steel plates 13, and more particularly, six magnetic embedding holes are formed.

The fastening holes 133 may have a substantially circular shape formed at predetermined intervals along the circumferential direction around the rotation axis X of the rotor 100. In the third embodiment of the present disclosure, 2n (n is a natural number) or an even number of the fastening holes 133 may be arranged around the center of the steel plates 13 at the predetermined intervals along the circumferential direction.

Here, six of the fastening holes 133 and the same number of the magnetic embedding holes 132 may be formed. Hereinafter, when these are distinguished, they may be denoted as 133a, 133b, 133c, 133d, 133e, and 133f along the circumferential direction.

The fastening holes 133 of the third embodiment of the present disclosure may be formed by passing the bolt that is the fastening member 40 described above to each of the fastening holes 133 of the stacked steel plates 13 to form a stage skew angle of 5° between the upper stage element 11 and the lower stage element 12 of the core 10. And any one of the intervals of the adjacent fastening holes 133 may be formed to have a different dimension from the other interval.

More particularly, as illustrated in FIG. 5, the three fastening holes 133a, 133c, and 133e arranged in one of the six fastening holes 133 described above may be formed at a reference position B in the case where the six fastening holes 133 are arranged at regular intervals along the circumferential direction around the rotation axis X of the rotor 100. The remaining three fastening holes 133b, 133d and 133f arranged in one of the six fastening holes 133 may be formed at a position where the stage skew angle θs (5° in the embodiment) is changed in the same direction along the circumferential direction from the reference position B.

Here, the reference position B may be a position set so that the relative positional relationship of the nearest reference position B with respect to each of the magnetic embedding holes 132 are the same.

The reference position B in the third embodiment of the present disclosure may be positioned between the magnetic embedding holes 132 and the shaft hole 131 and may be set so that the distance from the center C of the steel plates 13 to each of the reference positions B becomes the same on a line segment L connecting the center of the magnetic embedding holes 132 and the center C of the steel plates 13.

That is, in the third embodiment of the present disclosure, half of the fastening holes 133a, 133c and 133e arranged in one of the six fastening holes 133 may be formed so that a center O of each of the half of the fastening holes 133a, 133c and 133e may coincide with the reference position B. The remaining half of the fastening holes 133b, 133d and 133f may be formed so as to coincide with the center O of these and the reference position B, for example, at a position that is changed by 5° along the rotational direction of the rotor 100.

The intervals between the fastening holes 133b adjacent to each other, that is, the intervals between the fastening holes 133a, 133c, and 133e formed at the reference position B and the fastening holes 133b, 133d, and 133f formed at the positions which are changed by 5° from the reference position B may be a first interval, and a second interval different from the first interval.

With the above-described configuration, the fastening holes 133 may be arranged in a nonlinear symmetry with respect to a straight line passing through the center of the steel plate 13.

Subsequently, the progress of forming the stage skew angle of 5° by stacking the above-described steel plates 13 will be described with reference to FIG. 6.

Figure 6:
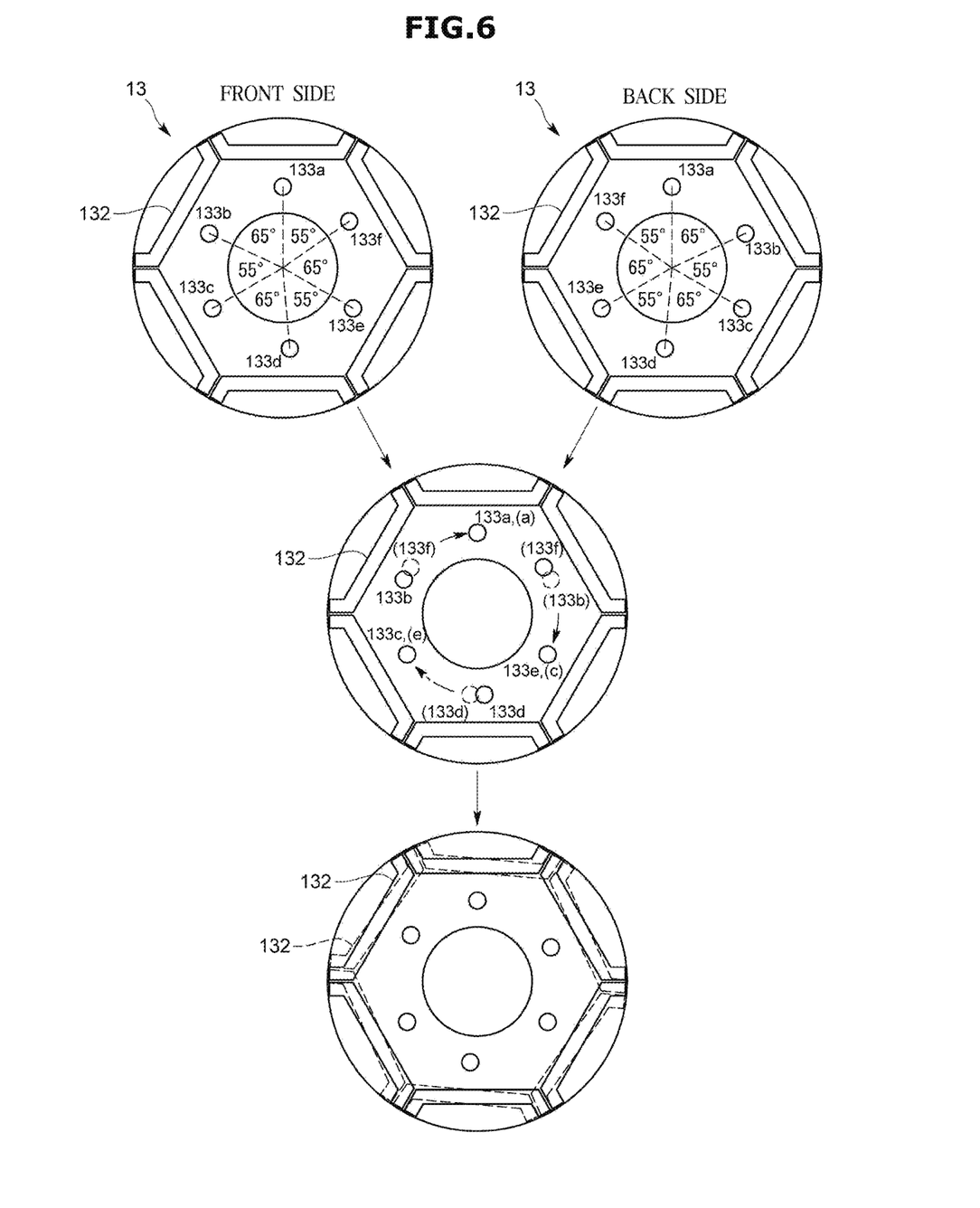
FIG. 6 is a schematic view illustrating the steel plate according to a modification of the third embodiment of the present disclosure.

FIG. 6 is a schematic view illustrating the steel plate according to a modification of the third embodiment of the present disclosure.

In FIG. 6, the steel plates 13 facing the front side may be formed with six of the fastening holes 133 in the order of the fastening holes 133a, 133b, 133c, 133d, 133e and 133f along the circumferential direction. The steel plates 13 facing the back side may be formed with six of the fastening holes 133 in the order of the fastening holes 133a, 133f, 133e, 133d, 133c, and 133b along the circumferential direction.

In the embodiment, the stage skew angle may be 5°, and an angle formed by the fastening holes 133 adjacent to each other and the center C of the steel plate may be 55° or 65°.

As illustrated in the middle of FIG. 6, when the steel plate 13 facing the front side is overlaid on the steel plate 13 facing the back side, the magnetic embedding holes 132 formed on the respective steel plates 13 may coincide with each other.

Meanwhile, with respect to the fastening holes 133 formed in the steel plates 13, as described above, the fastening holes 133a, 133c and 133e formed at the reference position B coincide with each other and the fastening holes 133b, 133d and 133f formed at the position which is changed by 5° from the reference position B do not coincide with each other.

When the steel plate 13 facing the back side is rotated clockwise by 55° from this state along the circumferential direction, as illustrated in the lower part of FIG. 6, all of the fastening holes 133 formed in the steel plates 13 may coincide with each other. And the magnetic embedding holes 132 formed in the steel plates 13 facing the front side and the magnetic embedding holes 132 formed in the steel plate 13 facing the back side may each skew 5°.

As described above, the rotor 100 according to the present embodiment may reverse the steel plate 13 constituting the upper stage element 11 and the steel plate 13 constituting the lower stage element 12 are reversed from the front side and the back side. The stage skew angle of 5° may be formed between the upper stage element 11 and the lower stage element 12 by aligning the fastening holes 133 formed in the respective steel plates 13 and passing through the fastening member.

In the internal permanent magnet motor according to the embodiment, since the plurality of fastening holes 133 may be arranged in the nonlinear symmetry, and the interval between the adjacent fastening holes 133 is the first interval and the second interval different from the first interval, it may become easier to distinguish the front and back sides of the steel plates 13, compared with the case where the fastening holes 133 are formed at regular intervals along the circumferential direction as in the conventional case.

Thus, when stacking the steel plates 13, there is a low possibility that the front and back sides are mistakenly stacked, and by forming the predetermined stage skew angle θ, the cogging torque may be reliably reduced.

Also, since it is easy to distinguish the front and back sides of the steel plates 13, the front and back sides of the steel plates 13 may be easily aligned, and the steel plates 13 may be easily managed.

Further, since each of the steel plates 13 has the same shape, for example, the cutting die, the metal mold, or the like for manufacturing the steel plates 13 may be made common, and the cost may be reduced and the manufacturing process may be simplified.

The present disclosure is not limited to the third embodiment. This will be described with reference to FIGS. 7 to 10.

Figure 7:
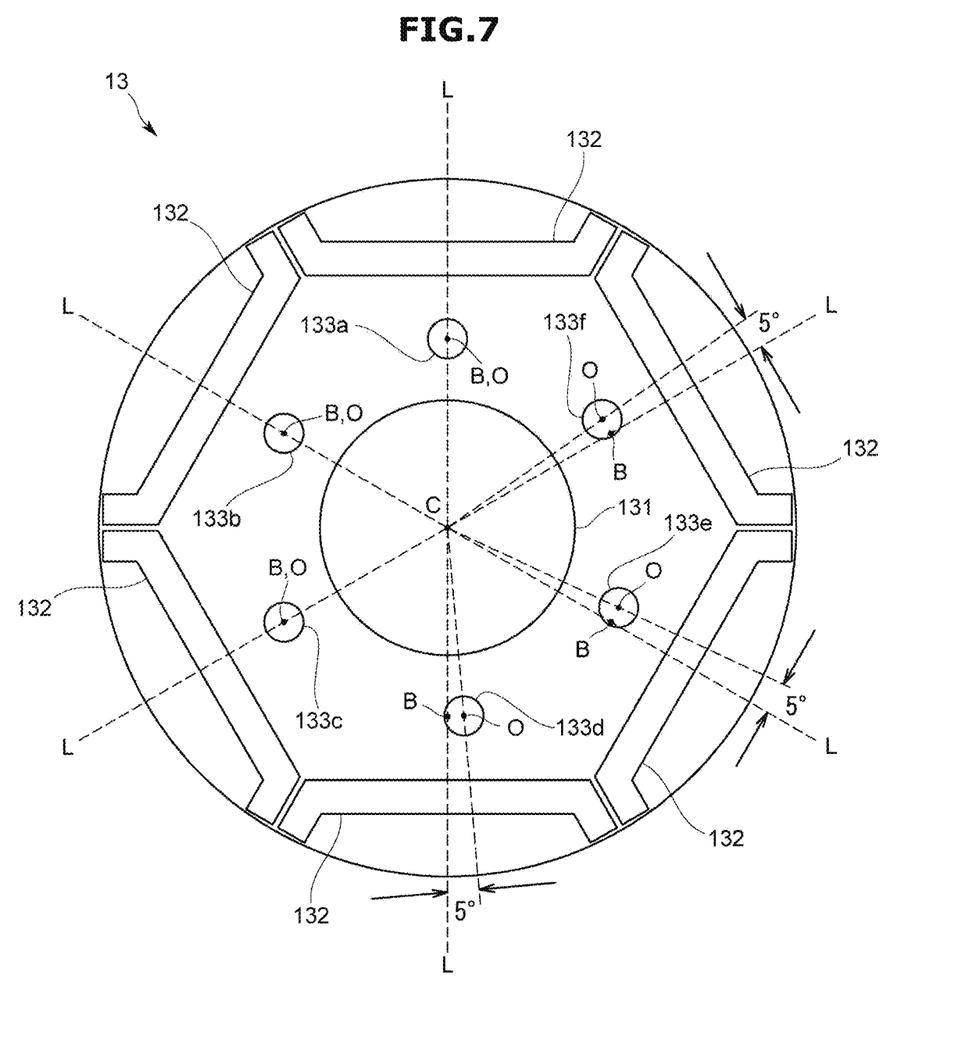
FIG. 7 is a schematic view illustrating the steel plate according to another modification of the third embodiment of the present disclosure.
Figure 8:
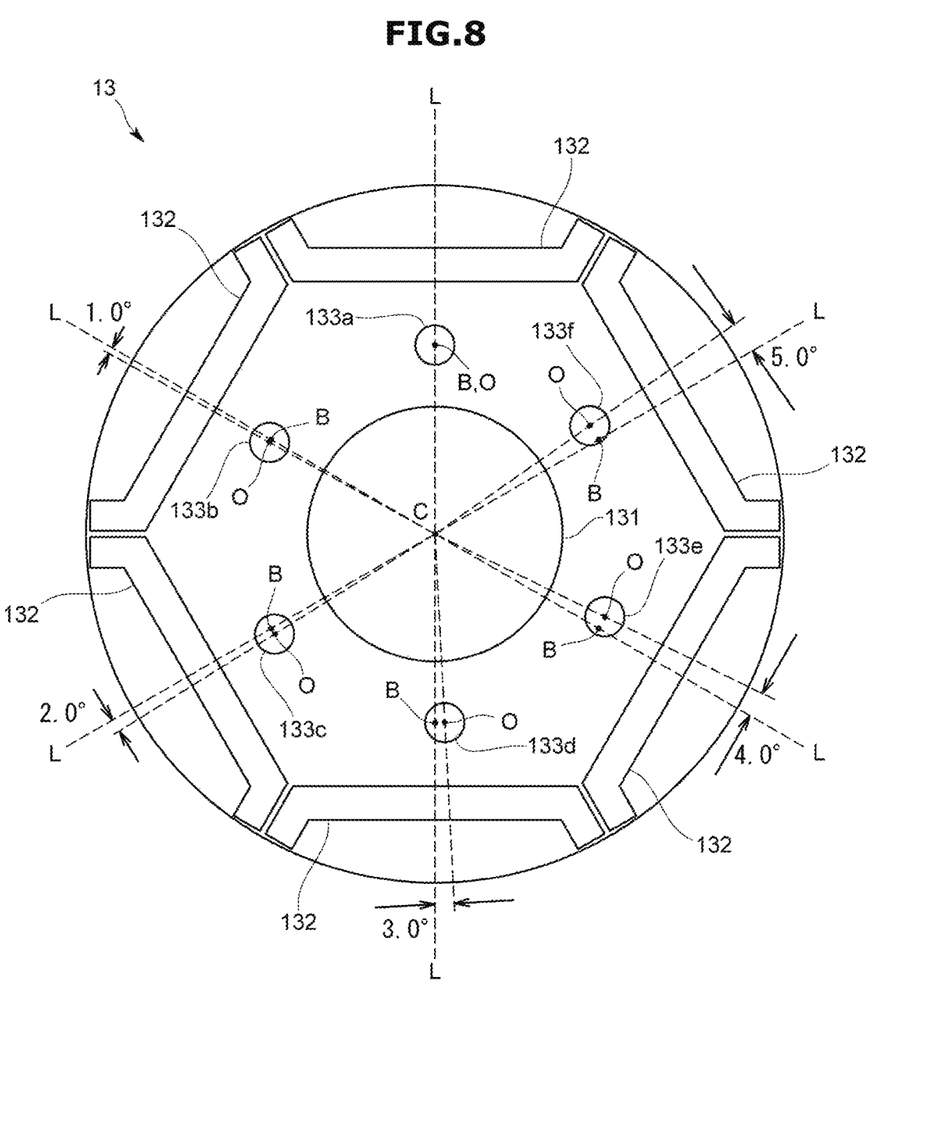
FIG. 8 is a schematic view illustrating the steel plate according to another modification of the third embodiment of the present disclosure.
Figure 9:
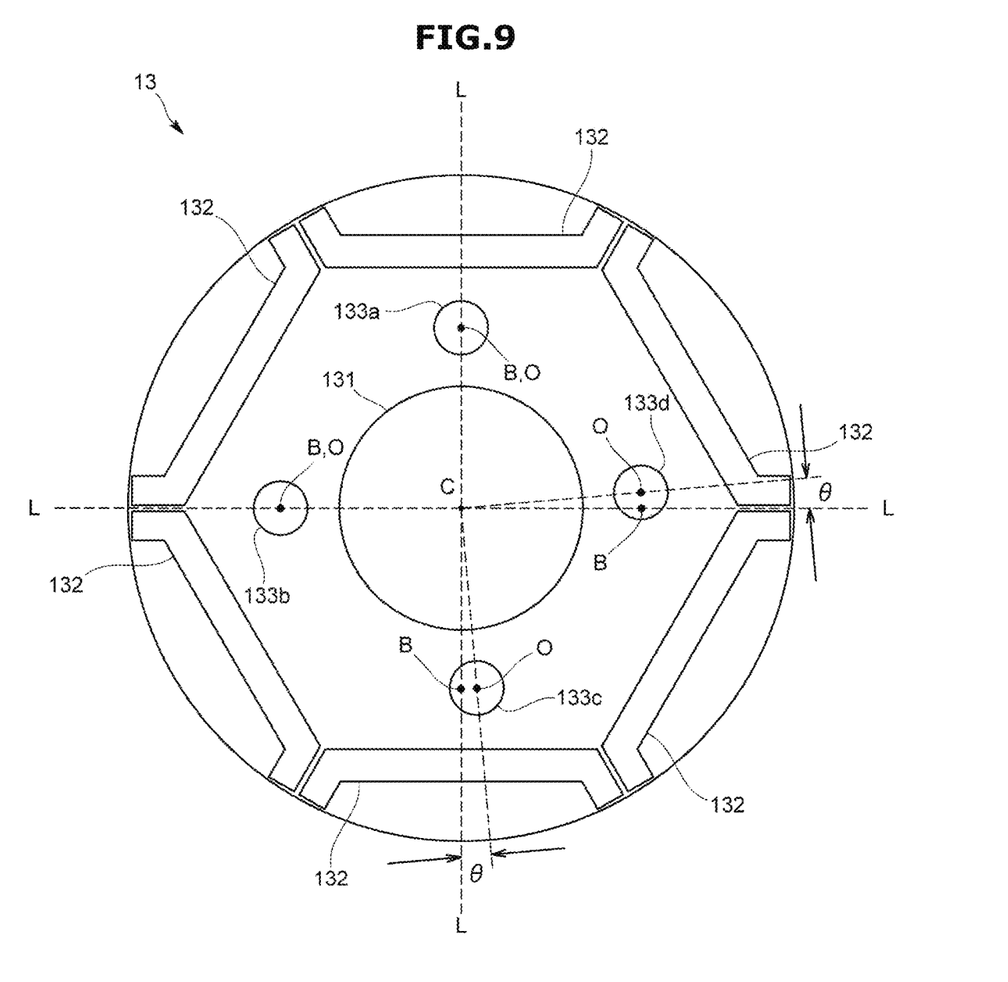
FIG. 9 is a schematic view illustrating the steel plate according to another modification of the third embodiment of the present disclosure.
Figure 10:
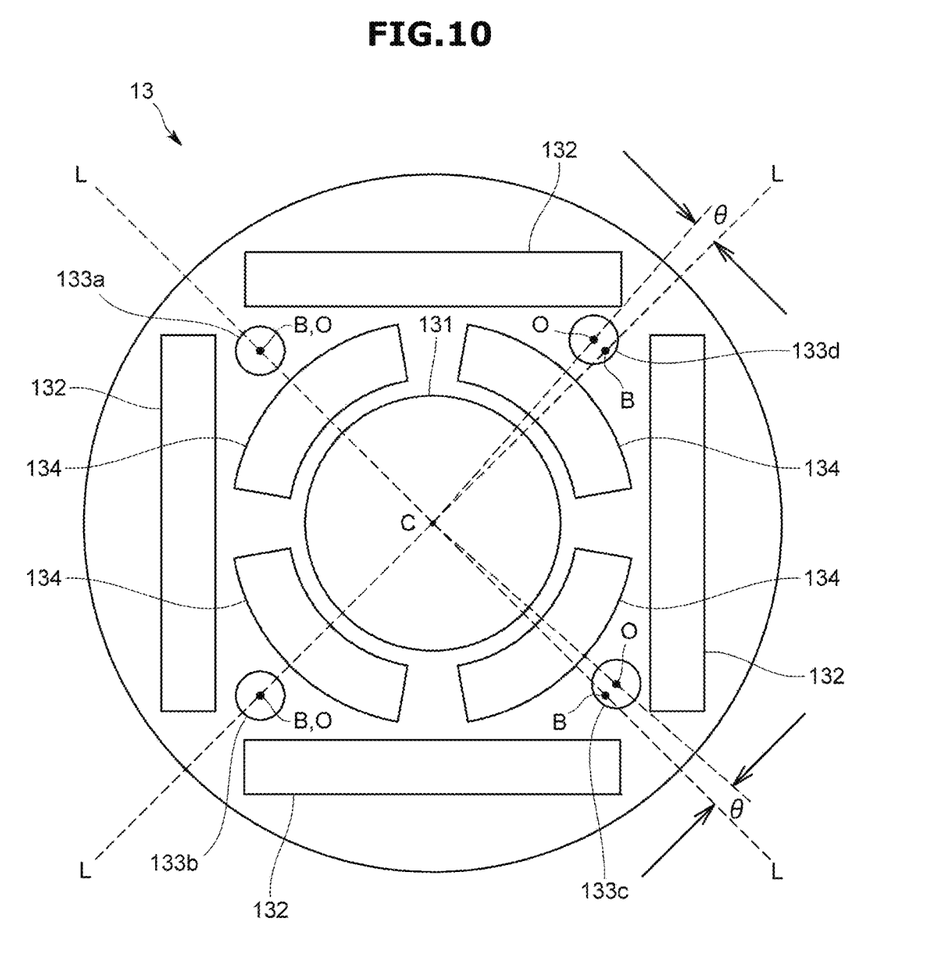
FIG. 10 is a schematic view illustrating the steel plate according to another modification of the third embodiment of the present disclosure.

FIG. 7 is a schematic view illustrating the steel plate according to another modification of the third embodiment of the present disclosure, FIG. 8 is a schematic view illustrating the steel plate according to another modification of the third embodiment of the present disclosure, FIG. 9 is a schematic view illustrating the steel plate according to another modification of the third embodiment of the present disclosure, and FIG. 10 is a schematic view illustrating the steel plate according to another modification of the third embodiment of the present disclosure.

The fastening holes 133 of the present disclosure may be formed at positions where the n fastening holes 133 formed in one of the 2n fastening holes 133 are changed by θ from the reference position B in the same direction along the circumferential direction. However, as illustrated in FIG. 7, the n consecutive fastening holes 133 of 2n may be formed so as to change from the reference position B in the same direction along the circumferential direction.

That is, as illustrated in FIG. 7, the steel plate 13 may be formed such that the center O of the consecutive half of the fastening holes 133a, 133b and 133c of the six fastening holes 133 coincides with the reference position B. The remaining half of the fastening holes 133d, 133e and 133f may be formed so as to coincide with the center O and the reference position B, for example, at a position changed by 5° along the rotational direction of the rotor 100.

Further, as illustrated in FIG. 8, the steel plate 13 may have the n fastening holes 133 and may be formed so that the angle formed by a line segment connecting the centers of the two fastening holes 133 and the rotation axis X of the rotor 100 is $(360/n)°-θ$ in the two fastening holes 133 adjacent to each other.

More particularly, as illustrated in FIG. 8, the fastening hole 133a may be formed such that its center O coincides with the reference position B. The center of each of the fastening holes 133b, 133c, 133d, 133e and 133f may be positioned at the position changed from the reference position B in the same direction along the circumferential direction of 1°, 2°, 3°, 4°, 5° respectively.

Thus, the space between the fastening hole 133a and the fastening hole 133f may be opened 55° with respect to the center C of the steel plate 13, and the space between the fastening hole 133a and the fastening hole 133b, the space between the fastening hole 133b and the fastening hole 133c, the space between the fastening hole 133c and the fastening hole 133d, the space between the fastening hole 133d and the fastening hole 133e, and the space between the fastening hole 133e and the fastening hole 133f may be all opened 61° with respect to the center C of the steel plate 13.

According to the above-described configuration, the plurality of fastening holes 133 may be arranged in the non-linear symmetry, and only the interval between the fastening hole 133a and the fastening hole 133f becomes shorter than the other interval in the intervals of the fastening holes 133 adjacent to each other, and it becomes easier to distinguish the front and back sides of the steel plates 13 as compared with the case where the fastening holes 133 are formed at regular intervals along the circumferential direction as in the conventional case.

In the steel plates 13 of the embodiment, the six fastening holes 133 may be formed. However, as illustrated in FIG. 9, for example, the steel plates 13 may be formed with four of the fastening holes 133.

As illustrated in FIG. 10, each of the steel plates 13 may be provided with a plurality of oil passage holes 134 through which oil for the compressor passes.

More particularly, the steel plate 13 may have the oil passage holes 134 formed at regular intervals along the circumferential direction around the rotation axis X of the rotor 100.

Here, the same number of the oil passage holes 134 as the magnetic embedding holes 132 may be formed.

As a result, the fastening member 40 may be passed through the fastening holes 133 formed in the stacked steel plates 13, so that the oil passage holes 134 formed in the steel plates 13 are overlapped with each other.

Accordingly, it possible to suppress deterioration of an oil circulation rate (OCR) when the internal permanent magnet motor described above is used in the compressor without narrowing the oil passage path while forming the predetermined stage skew angle θ, deterioration of the oil circulation rate (OCR) may be suppressed, and degradation of the coefficient of performance (COP) and the energy efficiency ratio (EER) may be prevented.

Further, although the rotor of the embodiment has six permanent magnets, the number of permanent magnets is not limited to the above embodiment, and may be four or the like.

Further, although the rotor of the embodiment has a 5° stage skew angle between the upper stage element and the lower stage element, the stage skew angle is not limited to the above embodiment but may be 7.5° or the like.

Further, when the steel plate according to the third embodiment of the present disclosure is used to form skew of three or more stages, it is possible to reduce only one of the sixth-order or twelfth-order harmonic components while reducing the cogging torque, and it is impossible to reduce both the sixth-order or twelfth-order harmonic components.

In addition, the rotor of the third embodiment of the present disclosure is configured to be able to set the stage skew angle θ to a desired value, based on the reduction rate with respect to the induced voltage when the stage skew angle θ=0°.

Here, the relationship between the stage skew angle θ and the reduction rate of the induced voltage is illustrated in Table 1 below.

TABLE 1

| Stage skew angle(°) | Reduction rate of induced voltage(%) |
| --- | --- |
| 0 | 100.00 |
| 10 | 99.91 |
| 20 | 98.97 |
| 30 | 97.18 |
| 40 | 94.56 |
| 50 | 91.13 |
| 60 | 86.94 |
| 70 | 82.02 |
| 80 | 76.44 |
| 90 | 70.27 |
| 100 | 63.57 |
| 110 | 56.43 |
| 120 | 48.91 |
| 130 | 41.11 |
| 140 | 33.07 |
| 150 | 24.89 |
| 160 | 16.61 |
| 170 | 8.30 |
| 180 | 0.00 |

As illustrated in [Table 1], it is desirable to reduce the induced voltage by increasing the stage skew angle θ in, for example, high-speed motor design. On the other hand, when it is desired to slightly reduce the induced voltage, conventionally, the gradation of the winding or the magnet is changed. However, by using the rotor of the third embodiment of the present disclosure, it is possible to cope with a slight change of the stage skew angle θ.

As described above, when the motor design is performed using the rotor of the third embodiment of the present disclosure, various motor specifications may be realized by changing the stage skew angle θ, and development of a new motor is not required, so that cost reduction may be achieved.

Further, the variable skew angle can be changed during operation of the motor, so that the variable magnetic flux control may be effectively performed.

It is needless to say that the present disclosure is not limited to the above-described embodiments, and that the configurations described in the embodiments may be combined, and that various modifications may be made without departing from the spirit of the present disclosure.

INDUSTRIAL AVAILABILITY

As described above, the present disclosure is very useful because it can realize various motor specifications by changing the stage skew angle θ and does not require the development of a new motor, so that the cost reduction can be achieved.

The invention claimed is:

1. An internal permanent magnet motor comprising:
a rotor configured to be formed by stacking a plurality of steel plates having a same shape,
wherein the rotor comprises:
an upper stage element stacked by aligning front and back sides of the plurality of steel plates, and
a lower stage element formed by aligning front and back sides of the plurality of steel plates,
wherein the front and back side of the steel plates forming the lower stage element are reversed with respect to the steel plates of the upper stage element,
wherein each of the steel plates of the upper stage element and the lower stage element comprises an even number 2n of fastening holes arranged around a center of the steel plates, wherein each fastening hole has a respective reference position, wherein each reference position has a same distance to the center of the steel plate and is positioned where a respective fastening hole would have been positioned if all 2n fastening holes would have been arranged at regular intervals along a circumferential direction, wherein half of the fastening holes is formed at a first interval, wherein a center of each of said fastening holes coincides with its respective reference position, wherein the remaining half of the fastening holes are arranged at a second interval such that the center of each of said fastening holes is positioned away in circumferential direction from its respective reference position by a skew angle in a same direction, and wherein the lower stage element is rotated until all of the fastening holes of the upper stage element are aligned with all of the fastening holes of the lower stage element and the skew angle is formed between the upper stage element and the lower stage element.

2. The internal permanent magnet motor according to claim 1, wherein the fastening holes are fastened by a fastening member, and
wherein the fastening member comprises bolts or rivets.

3. The internal permanent magnet motor according to claim 2, wherein the steel plates are configured to form one or a plurality of oil passage holes through which oil for a compressor is passed, and
wherein the bolts or rivets are configured to pass through the fastening holes so that the oil passage holes formed in the steel plates overlap each other.

4. The internal permanent magnet motor according to claim 2, wherein the skew angle θ is configured to be set based on a reduction rate with respect to an induced voltage when θ=0°.

5. The internal permanent magnet motor according to claim 1, wherein the rotor is configured to have a relation between number of poles p and number of slots s set to 1:3 or 1:6.

6. The internal permanent magnet motor according to claim 5, wherein the skew angle θ is configured to be determined by at least one of the following Equations 1 to 4:

$$\theta s = 120°/\text{LCM}(s \times p) \quad \text{[Equation 1]}$$

$$\theta s = 240°/\text{LCM}(s \times 33\, p) \quad \text{[Equation 2]}$$

$$\theta s = 90°/\text{LCM}(s \times p) \quad \text{[Equation 3]}$$

$$\theta s = 180°/\text{LCM}(s \times p) \quad \text{[Equation 4]}$$

wherein LCM(s×p) is a least common multiple of s and p.

7. An internal permanent magnet motor comprising:
a rotor configured to be formed by stacking a plurality of steel plates having a same shape,
wherein the rotor comprises:
an upper stage element stacked by aligning front and back sides of the plurality of steel plates, and
a lower stage element formed by aligning front and back sides of the plurality of steel plates,
wherein the front and back side of the steel plates forming the lower stage element are reversed with respect to the steel plates of the upper stage element,
wherein each of the steel plates of the upper stage element and the lower stage element comprises a number n of fastening holes arranged around a center of the steel plates,
wherein each fastening hole has a respective reference position, wherein each reference position has a same distance to the center of the steel plate and is positioned where a respective fastening hole would have been positioned if all n fastening holes would have been arranged at regular intervals along a circumferential direction,
wherein a center of a first fastening hole coincides with its respective reference position, and a center of each of the remaining fastening holes are positioned at a position changed from their respective reference position in a same direction along the circumferential direction,
wherein an angle between the first fastening hole and a fastening hole adjacent to it are arranged at an angle (360/n)°−θs, and an angle between the rest of the fastening holes is equal, wherein only the interval between the first fastening hole and adjacent to it is shorter than the other intervals of the fastening holes adjacent to each other, and
wherein the lower stage element is rotated until all of the fastening holes of the upper stage element are aligned with all of the fastening holes of the lower stage element and a skew angle is formed between the upper stage element and the lower stage element.

8. The internal permanent magnet motor according to claim 7, wherein the fastening holes are fastened by a fastening member, and
wherein the fastening member comprises bolts or rivets.

9. The internal permanent magnet motor according to claim 8, wherein the steel plates are configured to form one or a plurality of oil passage holes through which oil for a compressor is passed, and
wherein the bolts or rivets are configured to pass through the fastening holes so that the oil passage holes formed in the steel plates overlap each other.

10. The internal permanent magnet motor according to claim 8, wherein the skew angle θ is configured to be set based on a reduction rate with respect to an induced voltage when θ=0°.

11. The internal permanent magnet motor according to claim 7, wherein the rotor is configured to have a relation between number of poles p and number of slots s set to 1:3 or 1:6.

12. The internal permanent magnet motor according to claim 11, wherein the skew angle θ is configured to be determined by at least one of the following Equations 1 to 4;

$$\theta s = 120°/\text{LCM}(s \times p) \quad \text{[Equation 1]}$$

$$\theta s = 240°/\text{LCM}(s \times p) \quad \text{[Equation 2]}$$

$$\theta s = 90°/\text{LCM}(s \times p) \quad \text{[Equation 3]}$$

$$\theta s = 180°/\text{LCM}(s \times p) \quad \text{[Equation 4]}$$

wherein LCM(s×p) is a least common multiple of s and p.

* * * * *